United States Patent
Doshi et al.

(10) Patent No.: US 12,139,610 B2
(45) Date of Patent: Nov. 12, 2024

(54) THERMOPLASTIC POLYMER COMPOSITION HAVING IMPROVED MECHANICAL PROPERTIES

(71) Applicant: DUPONT POLYMERS, INC., Wilmington, DE (US)

(72) Inventors: Shailesh Ratilal Doshi, Kingston (CA); Qian Deng, Kingston (CA)

(73) Assignee: DuPont Polymers, Inc., Wilmington, DE (US)

( * ) Notice: Subject to any disclaimer, the term of this patent is extended or adjusted under 35 U.S.C. 154(b) by 650 days.

(21) Appl. No.: 17/386,083

(22) Filed: Jul. 27, 2021

(65) Prior Publication Data

US 2021/0355323 A1  Nov. 18, 2021

Related U.S. Application Data

(62) Division of application No. 14/840,158, filed on Aug. 31, 2015, now Pat. No. 11,104,798.

(60) Provisional application No. 62/059,177, filed on Oct. 3, 2014.

(51) Int. Cl.
    *C08L 77/06* (2006.01)
(52) U.S. Cl.
    CPC .................... *C08L 77/06* (2013.01)

(58) Field of Classification Search
    CPC ...... C08L 51/00; C08L 51/003; C08L 51/006; C08L 51/04; C08L 51/06; C08L 77/02–06; C08L 2205/02; C08L 2205/025; C08L 2205/035
    See application file for complete search history.

(56) References Cited

U.S. PATENT DOCUMENTS

2012/0196973 A1*  8/2012  Doshi ................ C08L 77/06
                                                        524/538

* cited by examiner

*Primary Examiner* — Ana L. Woodward
(74) *Attorney, Agent, or Firm* — Dority & Manning, P.A.

(57) ABSTRACT

Disclosed is a thermoplastic polymer composition of polyamide including: A) polyamide composition comprising, a) 55-90 weight percent semi-crystalline, semi-aromatic co-polyamide, and b) 10-45 weight percent aliphatic homo-polyamide; B) 5-40 weight percent of co-grafted polymeric toughener; wherein the co-grafted polymeric toughener is a co-grafted blend of polyolefins with at least two glass transition temperatures and obtained from the blend of polyolefins and a reactive monomer; C) 0-15 weight percent one or more plasticizers; D) 0-2.5 weight percent one or more antioxidants and or a heat stabilizer; E) 0 to 5 weight percent of additives selected from the group consisting of flame retardant, UV stabilizer, light stabilizer, thermal stabilizer, lubricant, colorant or the like. Further disclosed herein is a process for providing the composition and its application.

9 Claims, No Drawings

THERMOPLASTIC POLYMER COMPOSITION HAVING IMPROVED MECHANICAL PROPERTIES

CROSS REFERENCES TO RELATED APPLICATIONS

This application claims priority under 35 U.S.C. § 120 as a divisional of U.S. patent application Ser. No. 14/840,158, filed on Aug. 31, 2015, now allowed, which in turn claims priority to U.S. Provisional Application No. 62/059,177, filed on Oct. 3, 2014, each of which is incorporated herein by reference in its entirety.

FIELD OF INVENTION

The present invention relates to the field of polyamide (PA) compositions having improved mechanical properties at high temperature. The invention further relates to applications of the compositions for making tube, pipe, hose, belt or the like.

BACKGROUND OF INVENTION

Thermoplastic polymeric materials are used in automotive parts for their light weight, flexibility and ease of shaping into intricate parts of complex design, and are preferred over parts made of metals in many such applications. However, those polymeric parts occasionally exhibit premature failure due to cracking, when under stress and/or in contact with inorganic salts i.e. salt stress corrosion cracking (SSCC).

The presence of repeat units of aromatic origin, such as 6T unit in a co-polyamide chain, such as PA 612/6T, improve chemical resistance over corresponding aliphatic homopolyamide. US Patent Publication 2010/0233402 discloses semi-aromatic co-polyamide compositions of improved chemical resistance comprising at least 15 mole percent of such aromatic repeat units in polyamide chain.

The properties of a co-polyamide depend on the extent of repeat units present in the polymer. The presence of aromatic repeat units at about 50 mole percent in a co-polyamide can reduce the degree of crystallinity and demonstrates inferior high temperature mechanical performance compared to the corresponding homopolyamide. On the other hand, the presence of aromatic units greater than 55 mole percent in a co-polyamide may enhance degree of crystallinity and may demonstrate improved high temperature properties. However, those co-polyamides generally have melting points exceeding 300° C., which makes their extrusion processing to make articles such as, tube, hose, filaments, cable sheathing and jacketing and the like difficult.

The salt resistance and high temperature mechanical performance are influenced by the aromatic repeat unit content of the semi-aromatic co-polyamides in a mutually exclusive manner. U.S. Pat. No. 8,691,911 describes a polyamide composition comprising a melt blend of a semi-aromatic co-polyamide and an aliphatic homopolyamide, wherein the salt resistance property is improved and crystallinity is enhanced.

Compositions comprising entirely or almost entirely of polyamides are often too rigid and lack the toughness required to be used in parts uses such pipes, tubes, hoses, belts or the like. One way to enhance their toughness is to incorporate polymeric impact modifiers, also known as polymeric tougheners. Examples of polymeric tougheners are functionalized polyolefins that possess groups reactive to polyamides such as acid or acid anhydride groups. These functional groups can be incorporated into polyolefins by either copolymerization or reactive grafting. U.S. Pat. Nos. 6,380,320 and 5,451,639 describe processes for preparing functionalized polyolefins grafted with ethylenically unsaturated carboxylic acids or acid derivatives.

Polyolefins with a wide range of softening points, glass transition temperatures and flexibility are available and can be used to prepare such functionalized polyolefins. These include homopolymers of ethylene, propylene and their copolymers with longer chain alpha olefins or dienes. It is known in the art that polyolefins with a relatively low glass transition temperature, for example far below 0° C., are preferable as polymeric tougheners in polyamide compositions for improving cold temperature impact toughness. It is also known to incorporate more than one impact modifier in a polyamide composition, and all of them may not be functionalized. U.S. Pat. No. 4,346,194 describes a toughened polyamide containing an elastomeric olefin copolymer containing carboxyl derivatives. U.S. Pat. No. 6,077,906 describes a polyamide composition with an impact modifier that comprises maleated EPDM and a polyethylene.

One drawback of polyolefins with low glass transition temperatures is that they generally have low softening temperatures (also known as low softening points) and poor mechanical strength properties. Upon incorporation into polyamide compositions, they can cause a significant loss of strength properties especially at high temperatures. These compositions are not suitable for applications where parts are exposed to high temperatures approaching and exceeding 100° C., for example automotive under hood parts. There is a continuous need to develop tough and flexible semi-aromatic co-polyamide compositions that simultaneously exhibit good salt resistance, high temperature performance, cold impact performance and processability. The thermoplastic polymer compositions described herein provide good cold impact performance without detriment to the high temperature mechanical performance of the thermoplastic polymer composition.

SUMMARY OF THE INVENTION

Disclosed herein is a thermoplastic polymer composition, comprising:
A) a polyamide composition comprising:
  a) 55 to 90 weight percent semi-crystalline semi-aromatic co-polyamide; wherein said semi-aromatic co-polyamide comprises a-1) about 10 to 40 mole percent aromatic repeat units derived from:
    i) one or more aromatic dicarboxylic acids with 8 to 16 carbon atoms and an aliphatic diamine with 4 to 20 carbon atoms; and a-2) about 60 to 90 mole percent aliphatic repeat units derived from:
    ii) one or more aliphatic dicarboxylic acids with 6 to 20 carbon atoms and an aliphatic diamine with 4 to 20 carbon atoms; and
  b) 10 to 45 weight percent aliphatic homopolyamide; wherein said aliphatic homopolyamide comprises repeat units derived from:
    iii) an aliphatic dicarboxylic acid with 6 to 20 carbon atoms and an aliphatic diamine with 4 to 20 carbon atoms; or
    iv) an aliphatic lactam or an aliphatic amino carboxylic acid with 6 to 20 carbon atoms.
B) 5 to 40 weight percent co-grafted polymeric toughener; wherein the co-grafted polymeric toughener is a co-grafted blend of materials with at least two glass transition temperatures, obtained from polyolefins comprising:
- b1) 55-90 weight percent of a first polyolefin with at least one glass transition temperature >−20° C. and a softening temperature >75° C., and is selected from the group consisting of ethylene homopolymers, propylene homopolymers, copolymers of ethylene with one or more alpha-olefins having 3-10 carbon atoms, and copolymers propylene with one or more alpha-olefins having 2-10 carbon atoms;
- b2) 10-45 weight percent of a second polyolefin with a glass transition temperature <−20° C. and a softening temperature <75° C., and is selected from the group consisting of copolymers of ethylene with one or more alpha olefins or dienes, wherein the polyolefins (b1) and (b2) are melt blended and co-grafted with a reactive monomer, and optionally in the presence of a peroxide;

C) 0 to 15 weight percent of one or more plasticizers;
D) 0 to 2.5 weight percent of one or more antioxidants; and
E) 0 to 5 weight percent of one or more additives selected from the group consisting of flame retardant, UV stabilizer, light stabilizer, thermal stabilizer, lubricant, colorant or combinations of these; wherein the weight percent of B), C), D) and E), are based on the total weight of the thermoplastic polymer composition.

Further disclosed herein is a process for providing a thermoplastic polyamide composition comprising, components A) to E) as disclosed above, wherein the weight percent of B), C), D), and E) are based on the total weight of the composition; and wherein the co-grafted polymeric toughener, B), as described herein above is prepared and extruded from a first extruder in step a), melt mixed with a pre-calculated amount of pre-blended components A), C), D), E) in a second extruder in step b); or the co-grafted polymeric toughener is prepared in the first extruder and melt mixed with pre-calculated amount of dry blended components A), C), D), E) in the same extruder in a single step.

DETAILED DESCRIPTION

All references, patents and publications, cited in this description to more fully describe the state of the art to which this invention pertains, are incorporated by reference.

The following definitions apply to the terms as used throughout this specification, unless otherwise limited in specific instances.

Unless otherwise defined, all technical and scientific terms used herein have the same meaning as commonly understood by one of ordinary skill in the art to which this invention belongs. In case of conflict, the specification, including definitions, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein at levels that are appropriate for such additives and minor impurities are not excluded from a composition by the term "consisting essentially of".

The term "substantially free", as used herein with respect to a composition and a component, refers to a composition that includes no more than an adventitious amount of the component. Stated alternatively, the composition includes no added amount of the component, only the amount that is commonly present in the raw materials from which the composition is produced. In some commercially available materials, the level of adventitious components is less than 2.5%, less than 1.0%, less than 0.5%, or less than 0.1% by weight, based on the weight of the commercially available material.

The term "neat", as used herein, refers to a composition or a component that is substantially free of all other materials.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Described herein is a thermoplastic polymer composition comprising (a) a polyamide composition comprising a blend of semi-crystalline semi-aromatic co-polyamide and an aliphatic homopolyamide, wherein, (a1) the co-polyamide comprises aromatic repeat units derived from one or more aromatic dicarboxylic acids of 8 to 16 carbon atoms and aliphatic diamine of 4 to 20 carbon atoms and aliphatic repeat units derived from one aliphatic dicarboxylic acid of 6 to 20 carbon atoms and aliphatic diamine of 4 to 20 carbon atoms and (a2) the homopolyamide is derived from one aliphatic dicarboxylic acids of 6 to 20 carbon atoms and said aliphatic diamine of 4 to 20 carbon atoms or a lactam or an aminoacid of 6 to 20 carbon atoms, (b) a co-grafted polymeric toughener, wherein the co-grafted polymeric toughener is a co-grafted blend with at least two glass transition temperatures derived from polyolefins, (c) a plasticizer, (d) an antioxidant and (e) additives selected from the group consisting of light stabilizers, flame retardants, thermal stabilizers, lubricants, and colorants.

The disclosure further describes a process of making the thermoplastic polymer composition and applications of the composition as articles such as pipe, tube, hose, and belt suitable for automotive fuel lines, truck air brake tubes and pneumatic/hydraulic industrial tubing and the like.

The compositions described herein show improved high temperature mechanical performance, cold temperature toughness and retention of those properties when exposed to moisture saturation and high temperature aging as described in the example section to comply with the requirements of The US Department of Transportation (DOT) Standard 571.106 and ISO 7628 standard followed in European countries.

As used herein, the term "reactive monomer" refers to an ethylenically unsaturated carboxylic acid or its derivative that can be grafted on to a polyolefin backbone through a free radical reaction.

As used herein, the term "functionalization" refers to a free radical grafting reaction carried out to attach the reactive monomer onto the polyolefin backbone. The reaction involves melting the polyolefin, creating free radical sites on its backbone through optional use of a peroxide, injecting the reactive monomer into the molten polyolefin and affecting the grafting reaction.

As used herein, the term "co-grafting" refers to a grafting reaction carried out with at least two largely immiscible polyolefins that are melt-mixed to create a multi-phase morphology of the minor phase dispersed within the major phase, and while in the molten state, the polyolefin phases are simultaneously and randomly grafted with one or more reactive monomers.

As used herein, the term "base polymer type for polymeric toughener" refers to the type of polyolefin, either a homopolymer or a copolymer of olefins, or a melt blend of two or more such polyolefins that is to be grafted with reactive monomer(s) in order to form a functionalized polymeric toughener for polyamides.

As used herein, the term "olefinic polymeric toughener" refers to polyolefin homopolymers or copolymers which may or may not be grafted or functionalized and are disclosed in U.S. Provisional Application No. 62/059,177 as EO1, EO2. EO3, EO4, EO6, PE1, PP1, PP2, PP3, and PP4.

As used herein, the term "co-grafted polymeric toughener" refers to a blend of two polyolefins having different glass transition temperatures and wherein the blend of polyolefins is grafted or functionalized with a reactive monomer such as maleic anhydride and exemplified by CG1, CG2, CG3, CG4, and CG7 in U.S. Provisional Application No. 62/059,177.

As used herein, "major phase" refers to the continuous matrix phase of a polymeric blend formed by the polymer present in larger volumetric proportion.

As used herein, "minor phase" refers to the discontinuous phase that is dispersed within the matrix phase and is formed by the polymer present in smaller volumetric proportion.

As used herein, "moisture saturation" refers to the state where a polyamide composition has absorbed a sufficient amount of moisture to be in equilibrium with 100% relative humidity environment.

As used herein, "burst pressure" refers to the maximum pressure at which a tubing of given dimensions (external diameter, wall thickness and length) bursts when subjected to continuously increasing internal fluid pressure at a controlled rate and under defined conditions of temperature, the tubing having been conditioned per a specified protocol prior to being subjected to pressurization.

Polyamides disclosed herein are homopolymers or co-polymers wherein the term co-polymer refers to polyamides that have two or more amide and/or diamide molecular repeat units in the polymer chain. The homopolymers and co-polymers are identified by their respective repeat units. For co-polymers disclosed herein in the present disclosure, the repeat units are listed in decreasing order of mole % repeat units present in the co-polymer. The following list exemplifies the abbreviations used to identify monomers and repeat units in the homopolymer and co-polymer of polyamides (PA):

HMD Hexamethylene diamine (or 6 when used in combination with a diacid)
T Terephthalic acid
AA Adipic acid
DMD Decamethylenediamine
6 ε-Caprolactam
DDA Decanedioic acid
DDDA Dodecanedioic acid
I Isophthalic acid
TMD 1,4-tetramethylene diamine
6T polymer repeat unit formed from HMD and T
66 polymer repeat unit formed from HMD and AA
10T polymer repeat unit formed from DMD and T
610 polymer repeat unit formed from HMD and DDA
612 polymer repeat unit formed from HMD and DDDA
6 polymer repeat unit formed from ε-caprolactam
11 polymer repeat unit formed from 11-aminoundecanoic acid
12 polymer repeat unit formed from laurolactam Note that in the art the term "6" when used alone designates a polymer repeat unit formed from ε-caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid.

Likewise, repeat units derived from other amino acids or lactams are designated as single numbers designating the number of carbon atoms.

Co-polymer repeat units are separated by a slash (that is, /). For instance poly(hexamethylene dodecanediamide/hexamethylene terephthalamide) is abbreviated PA 612/6T (75/25), and the values in brackets are the mole % repeat unit of each repeat unit in the copolymer.

Semi-crystalline, semi-aromatic copolyamides useful in the present thermoplastic composition comprise a-1) about 10 to 40 mole percent aromatic repeat units derived from:
   i) one or more aromatic dicarboxylic acid with 8 to 16 carbon atoms and an aliphatic diamine with 4 to 20 carbon atoms; and a-2) about 60 to 90 mole percent aliphatic repeat units derived from:
   ii) one or more aliphatic dicarboxylic acid with 6 to 20 carbon atoms and said aliphatic diamine with 4 to 20 carbon atoms.

The aromatic dicarboxylic acids of semi-crystalline semi-aromatic co-polyamide with 8 to 16 carbon atoms include terephthalic acid, isophthalic acid, and 2,6-napthalenedioic acid. Terephthalic acid and isophthalic acid are preferred.

The aliphatic dicarboxylic acids of semi-crystalline semi-aromatic co-polyamide with 6 to 20 carbon atoms may include adipic acid, sebacic acid, decanedioic acid, dodecanedioic acid, tridecanedioic acid, tetradecanedioic acid, hexadecanedioic acid, octadecanedioic acid. Dodecanedioic acid and decanedioic acid are preferred aliphatic dicarboxylic acids.

The aliphatic diamines of semi-crystalline semi-aromatic co-polyamide may have 4 to 20 carbon atoms; and more preferably selected from the group consisting of hexamethylenediamine (HMD), 1,10-decanediamine, 1,12-dodecanediamine, and 2-methyl-1,5-pentamentylenediamine.

Semi-crystalline semi-aromatic copolyamides useful in the thermoplastic compositions include those selected from the group consisting of: PA 612/6T (85/15) to (55/45), and preferably PA 612/6T (75/25), PA 612/6T (70/30) and PA 612/6T (60/40); PA 610/6T (85/15) to (55/45) and preferably PA 610/6T (80/20), PA 610/6T (75/25) and PA 610/6T (60/40); PA1010/10T (85/15) to (55/45), and preferably PA 1010/10T (80/20); PA 612/6I (90/10) to (70/30), and preferably PA 612/6I (85/15); and PA 612/6T/6I having a mole percent of 6T+6I of from 15 to 45 mol percent and the ratio of T to I is about 4:1 to 1:1, and preferably PA 612/6T/6I (80/10/10) and (75/20/5). Preferred semi-crystalline semi-aromatic co-polyamide are PA 612/6T and PA 610/6T.

Aliphatic homopolyamides useful in the thermoplastic composition comprise repeat units derived from:
   iii) an aliphatic dicarboxylic acid with 6 to 20 carbon atoms and an aliphatic diamine with 4 to 20 carbon atoms; or
   iv) an aliphatic lactam or an aliphatic aminoacid with 6 to 20 carbon atoms The aliphatic dicarboxylic acid of aliphatic homopolyamide with 6 to 20 carbon atoms may be the same as disclosed above for the aliphatic dicarboxylic acid of semi-crystalline semi-aromatic co-polyamides. The aliphatic diamine of aliphatic homopolyamide with 4 to 20 carbon atoms may be the same as disclosed above for the aliphatic diamines of semi-crystalline semi-aromatic copolyamides. Preferred second aliphatic diamine is HMD. Lactam or an aminocarboxylic acid of aliphatic homopolyamide includes ε-caprolactam, laurolactam, and 11-amino undecanoic acid. ε-Caprolactam is preferred.

Aliphatic homopolyamides useful in the present thermoplastic composition include PA 410, PA 412, PA 612, PA 610, PA 1010, PA 614, PA 616, PA 618, PA 6, PA. 12 and PA 11. More preferably, aliphatic homopolyamide useful in the present thermoplastic composition is PA 612 and PA 610.

Preferably the aliphatic dicarboxylic acid and the aliphatic diamine present in the aliphatic homopolyamide are the same as the aliphatic dicarboxylic acid and the aliphatic diamine present in the semi-crystalline semi-aromatic co-polyamide.

Table 1 lists combinations of semi-crystalline semi-aromatic copolyamides and aliphatic homopolyamides useful in the present invention.

TABLE 1

| Semi-crystalline semi-aromatic co-polyamide | Aliphatic homopolyamide[a] |
|---|---|
| PA 612/6T (85/15) to (55/45) including compositions: | PA 612 |
| 55 to 90 percent by weight PA 612/6T (75/25) | |
| 55 percent by weight PA 612/6T (75/25) | |
| 65 percent by weight PA 612/6T (75/25) | |
| 55 to 90 percent by weight PA 612/6T (85/15) | |
| 70 percent by weight PA 612/6T (85/15) | |
| 55 percent by weight PA 612/6T (85/15) | |
| PA 610/6T (85/15) to (55/45) Including compositions: | PA 610 PA 6 |
| 55 to 90 percent by weight PA 610/6T (80/20) | |
| 67.5 percent by weight PA 610/6T (80/20) | |

[a]percent by weight of aliphatic homopolyamide is 100% minus the stated percent by weight of semi-crystalline semi-aromatic polyamide.

Co-grafted polymeric tougheners described herein are co-grafted blends of two or more polyolefins exhibiting at least two glass transition temperatures; wherein the first polyolefin forming the major phase has a density in the range of 0.88 to 0.96 g/cc measured per ASTM D792 specification., it has at least one glass transition temperature (Tg) >−20° C. determined per ASTM D4065 procedure for dynamic mechanical properties and softening temperature (Tm) in the range of 75 to 175° C. measured as per ASTM D3418 specification by differential scanning calorimetry (DSC) and is selected from ethylene homopolymers, propylene homopolymers, ethylene copolymers with one or more alpha olefins having 3-10 carbon atoms and propylene copolymers with one or more alpha olefins having 2-10 carbon atoms; the second polyolefin forming the minor phase has density <0.88 g/cc measured per ASTM D792 specification, its highest glass transition temperature (Tg) <−20° C. determined per ASTM D4065 procedure for dynamic mechanical properties and softening temperature Tm <75° C. measured as per ASTM D3418 specification by differential scanning calorimetry (DSC), and is selected from the group consisting of ethylene/α-olefin or ethylene/α-olefin/diene copolymers. Co-grafting means that the two polyolefins are melt mixed in desired proportions such that the minor phase is dispersed within the major phase, and the two phases are simultaneously and randomly grafted with an unsaturated carboxylic anhydride to form the multi-phase impact modifier. The two polyolefin phases are immiscible to the extent that the blend exhibits multiple glass transition temperatures with at least one being >−20° C. and at least one being <−20° C. The softening point of the blend is dictated by that of the first polyolefin forming the major phase, and is >75° C.

It is preferred that the co-grafted polymeric tougheners contain about 0.05 to about 5 percent by weight of grafted molecules (grafting percentage) containing functional groups. There may be more than one type of reactive monomer present in the co-grafted polymeric toughener, and/or more than one co-grafted polymeric toughener. In one embodiment, the co-grafted polymeric tougheners comprise about 0.1 to about 3 percent by weight of grafted molecules containing functional groups.

Automotive under-hood components need to comply with a variety of government and industry specifications and regulations. Tubing and hoses used in truck air brake systems in North America, need to comply with The US Department of Transportation (DOT) 571.106 Specification that prescribes a set of tests. According to this specification, tube must have an initial minimum burst pressure. One of the tests requires the tube to be conditioned by immersion in boiling water for 2 hours, followed by a defined cold impact test at −40° C., and then measurement of its burst pressure (defined in details in method). Test results demand for retention of at least 80% of the original burst pressure specification value after conditioning. All polyamide compositions absorb water, and 2 hour conditioning in boiling water essentially results in moisture saturation of the tube material. Accompanying change in burst pressure of the tube is driven by the type and amount of polyamide of the composition. Olefinic polymeric tougheners, such as ethylene/alpha-olefin copolymers, incorporated in the composition act as a diluent to polyamide, and in turn assists to reduce the amount of absorbed moisture; however, it has low strength properties compared to polyamide, and hence impairs the tube burst property of the impact modified composition.

Tubing used in truck air brake system in regions following the ISO 7628 need to comply with the requirements of that standard, According to this standard, tubes require a specified minimum burst pressure. Further they require specified burst pressure at temperatures of 100° C. and 125° C., while having very good impact toughness at −40° C. In order to provide specified cold impact toughness of the tube, an impact modifier needs to have a low glass transition temperature and low crystallinity. Olefinic copolymers such as ethylene/alpha-olefin copolymers exhibit these characteristics. However, they also have low softening points at or below 75° C., and as a result they have a detrimental effect on tube burst pressure at temperatures >100° C. More crystalline polymeric modifiers such as those based on high density, linear low density or low density polyethylenes or propylene homopolymers or copolymers have higher softening points, but have comparatively higher glass transition temperature also, and thus do not provide good cold impact toughness in polyamide compositions.

One approach to provide both good cold impact toughness and better high temperature burst pressure could be to use two different polymeric tougheners to toughen the polyamide composition—one with a high Tg and the other with a low Tg. As the examples below demonstrate, this approach does not provide sufficient desired improvement. It was however discovered that when the two types of polyolefins, one with high Tg and the other with low Tg, are melt blended and co-grafted prior to incorporation into the polyamide composition, a surprisingly improved high temperature burst pressure is achieved without compromising the cold impact toughness and flexibility. The tubes prepared from these compositions also exhibit properties necessary to comply with the boiling water conditioning, cold impact and burst test called for the DOT 571.106 specification.

Accordingly, the present disclosure describes incorporation of a co-grafted polymeric toughener derived from at least two base polymer type polyolefins wherein the first polyolefin forming the major phase of the toughener has a density in the range of 0.88 to 0.96 g/cc, it has at least one glass transition temperature (Tg) >−20° C., softening temperature (Tm) in the range of 75 to 175° C. and is selected from ethylene homopolymers, propylene homopolymers, ethylene copolymers with one or more alpha olefins having 3-10 carbon atoms and copolymers of polypropylene with one or more alpha olefins having 2-10 carbon atoms; the second polyolefin forming the minor phase of the impact modifier has a density of <0.88 g/cc, has highest glass transition temperature (Tg) <−20° C. and softening temperature Tm <75° C., and it is selected from the group consisting of ethylene/α-olefin or ethylene/α-olefin/diene copolymers.

Softening point, or softening temperature, is either the melting point of the polyolefin if it exhibits one for example in a differential scanning calorimetric scan. An elastomeric polyolefin copolymer may not exhibit a clear melting point, in which case, the softening point is the minimum temperature at which the polymer transforms from a solid to a maleable viscous liquid state.

The co-grafted polymeric tougheners described herein may exhibit multiple glass transition temperatures reflecting the immiscibility of the polyolefin phases with at least one being >−20° C. and the at least one <−20° C., and its softening point is dictated by that of the first polyolefin forming the major phase and is >75° C. Of the two glass transition temperatures, the first is preferably in the temperature range between about −25° C. and about −50° C. and the second is preferably in the temperature range between about 0° C. and 25° C. The softening point is preferably in the range of about 75° C. to about 175° C.

The minimum concentration of co-grafted polymeric toughener in the thermoplastic polymer compositions described herein is 0.5, preferably 2.5, and more preferably about 5 percent by weight of the thermoplastic polymer composition, while the maximum amount of polymeric toughener is about 50 weight percent, preferably about 45 weight percent. Preferably, the concentration of co-grafted polymeric toughener in the thermoplastic polymer composition ranges between about 5 percent by weight to about 45 percent by weight with respect to total weight of the thermoplastic polymer composition.

Non-limiting examples of co-grafted polymeric tougheners described herein include:

(a) a co-grafted combination (2:1) of propylene impact copolymer such as a heterogeneous propylene-ethylene impact copolymer and a copolymer of ethylene and 1-octene;

(b) co-grafted combination (1.2:1) of polypropylene impact copolymer and copolymer of ethylene and 1-octene;

(c) co-grafted combination (2:1) of polypropylene homopolymer and copolymer of ethylene and 1-octene;

(d) co-grafted combination (2:1) of homogeneous random propylene-ethylene copolymer and a copolymer of ethylene and 1-octane;

(e) a co-grafted combinations (2:1) of linear low density polyethylene (LLDPE) and copolymer of ethylene and 1-octene and (f) a co-grafted combination (2:1) of high density polyethylene (HDPE) and a copolymer of ethylene and 1-octene.

The polyamide composition used in the present invention may further comprise additives. A preferred additive is at least one antioxidant or a heat stabilizer. Examples of suitable antioxidants are sterically hindered phenolic compounds, aromatic secondary amines and phosphites. Examples of sterically hindered phenol include, N,N'-hexane-1,6-diylbis(3-(3,5-di-tert.-butyl-4-hydroxyphenyl-propionamide)), Pentaerythritol tetrakis(3-(3-tert-butyl-4-hydroxyphenyl)propionate), Octadecyl-3-(3,5-di-tert.butyl-4-hydroxyphenyl)-propionate, 1,3,5-Trimethyl-2, 4,6-tris(3,5-di-tert-butyl-4-hydroxybenzyl)benzene, 2',3 bis [3,5 ditertiary butyl, 4 hydroxyphenyl) propionyl]propiono-hydrazide, N, N' hexane-1,6-diylbis[3,5 ditertiary butyl-4-hydroxyphenyl propionamide or the like. N,N'-hexane-1,6-diylbis(3-(3,5-di-tert.-butyl-4-hydroxyphenylpropionamide)) is preferred. Examples of aromatic secondary amines include 4, 4'-Bis (alpha, alpha-dimethylbenzyl) diphenylamine, 2,4-Bis(n-octylthio)-6-(4'-hydroxy-3,5-di-tbutylanilino)-1,3,5-triazine. Examples of phosphites include Tris(2,4-di-t-butylphenyl) phosphite, Tris(nonylphenyl) phosphite, Diphenyl mono(tridecyl) phosphite and similar. Examples of heat stabilizers include Cu salts such as CuI, Cuprous acetate in combination with a potassium salt such as KI or KBr.

The antioxidant and heat stabilizers may be incorporated into the thermoplastic composition during extrusion of the composition or during polymerization. If incorporated during polymerization, the polyamide monomers are mixed with one or more additives prior to starting the polymerization cycle and the mixture is introduced to the polymerization reactor. Alternatively, the antioxidant can be added to the reactor during the polymerization cycle. Preferably, the antioxidant is incorporated in the composition during extrusion.

When used, the antioxidant will be present in the composition in about 0.25 to about 2.5 percent by weight, alternatively the antioxidant may be present in the composition in about 0.1 to about 3 percent by weight. Copper based heat stabilizers, if used, may be present to provide about 10 to 500 ppm of Cu and 1000 to 3000 ppm of halogen.

The polyamide compositions described herein may further comprise a plasticizer. The plasticizer will preferably be miscible with the polyamide. Examples of suitable plasticizers include sulfonamides, preferably aromatic sulfonamides such as benzenesulfonamides and toluenesulfonamides. Examples of suitable sulfonamides include N-alkyl benzenesulfonamides and toluenesulfonamides, such as N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide. U.S. Pat. No. 6,348,563 describes a parahydroxy benzoic ester based plasticizer suitable for such polyamides.

The plasticizer may be incorporated into the thermoplastic composition during extrusion of the composition or during polymerization. If the plasticizer is incorporated during polymerization, the polyamide monomers are mixed with the plasticizer prior to starting the polymerization cycle and the mixture is introduced to the polymerization reactor. Alternatively, the plasticizer can be added to the reactor during the polymerization cycle. Preferably, the plasticizer is incorporated in the composition during extrusion.

The plasticizer, if used, will be present in the composition at most 15 percent by weight.

The polyamide compositions described herein may optionally comprise additional additives such as thermal, oxidative, and/or light stabilizers; colorants; lubricants; mold release agents; and the like. Such additives can be added in conventional amounts according to the desired properties of the resulting material, and the control of these amounts versus the desired properties is within the knowledge of the skilled artisan.

When present, additives may be incorporated into the polyamide compositions described herein by melt-blending using any known methods. The component materials may be dry blended and compounded to homogeneity using a melt-mixer such as a single or twin-screw extruder, blender, kneader, Banbury mixer, etc. to give a polyamide composition. Alternatively, part of the materials may be compounded in a first melt-mixer, and the rest of the materials may then be added and further melt-mixed until homogeneous.

Further provided is a process for providing a thermoplastic composition comprising:
A) preparing a mixture, b3), comprising a blend of two or more polyolefins exhibiting at least two glass transition temperatures obtained by feeding in an extruder:
  i) 55-90 weight percent of a first polyolefin, b1), with at least one glass transition temperature >−20° C., a softening temperature >75° C., and a density in the range of 0.88 to 0.96 g/cc, and is selected from ethylene homo-polymers, propylene homo-polymers and copolymers of ethylene and propylene; and
  ii) 10-45 weight percent of a second polyolefin, b2), with a glass transition temperature <−20° C., a softening temperature <75° C., and a density of <0.88 g/cc, and is selected from copolymers of ethylene with one or more alpha olefins and/or dienes, such as propylene, 1-butene, 1-hexene; 1-octene; butadiene, hexadiene, norbornene, norbornadiene, and
  iii) at least one reactive monomer;
  iv) optionally one peroxide to form the co-grafted polymeric toughening agent; and
  v) removing unreacted reactive monomer whenever required;
    and optionally extruding and pelletizing the co-grafted polymeric toughener; and
B) melt blending 5 to 45 weight percent of said mixture obtained in step (A) with a polyamide composition comprising;
  vi) 55 to 90 weight percent semi-crystalline semi-aromatic co-polyamide; wherein said semi-aromatic co-polyamide comprises
    a) about 10 to 40 mole percent aromatic repeat units derived from one or more aromatic dicarboxylic acid with 8 to 16 carbon atoms and an aliphatic diamine with 4 to 20 carbon atoms; and
    b) about 60 to 90 mole percent aliphatic repeat units derived from one or more aliphatic dicarboxylic acid with 6 to 20 carbon atoms and said aliphatic diamine with 4 to 20 carbon atoms;
  vii) 10 to 45 weight percent aliphatic homo-polyamide; wherein said aliphatic homo-polyamide comprises repeat units derived from
    c) an aliphatic dicarboxylic acid with 6 to 20 carbon atoms and an aliphatic diamine with 4 to 20 carbon atoms; or
    d) an aliphatic lactam or an aliphatic aminocarboxylic acid with 6 to 20 carbon atoms;

wherein the weight percent of vi) and vii) are based on the total weight of vi) and vii);

viii) 0 to 15 weight percent, plasticizers;

ix) 0 to 2.5 weight percent, weight percent antioxidants and/or heat stabilizers;

x) 0 to 5 weight percent of additives selected from the group consisting of flame retardant, UV stabilizer, light stabilizer, thermal stabilizer, lubricant, colorant or the like; wherein the weight percent of the polymeric toughener b3, viii), ix) and x), are based on the total weight of the thermoplastic composition; wherein components vi), vii), viii), ix), and x) are melt blended in step (B) in the downstream of the first extruder where said mixture, b3) is obtained in step (A) or the components are melt blended in step (B) in a second extruder where the mixture obtained in step (A) is optionally extruded.

In another aspect, the present invention relates to a method for manufacturing an article by shaping the thermoplastic polymer compositions. Examples of articles are films, laminates, filaments, fibers, monolayer tubes, hoses, pipes, multi-layer tubes, hoses and pipes with one or more layers including braided, convoluted and corrugated tubes and hoses formed from the above composition, and automotive parts including engine parts. Multi-layer tubes, pipes and hoses may comprise other layers such as barrier layers, conductive layers, reinforcing layers, adhesive tie layers, abrasion resistance layers and such. By "shaping", it is meant any shaping technique, such as for example extrusion, injection molding, thermoform molding, compression molding, blow molding, filament spinning, sheet casting or film blowing. Preferably, the article is shaped by extrusion or injection molding.

The molded or extruded thermoplastic articles disclosed herein may have application in many vehicular, industrial and consumer product components that meet one or more of the following requirements: resistance against road salts, hydrolysis by water and coolants such as glycol solutions, fuels, alcohols, oils, chlorinated water; high impact resistance especially under cold environment; improved retention of mechanical properties at high temperatures such as automotive under-hood temperatures; significant weight reduction (over conventional metals, for instance); and noise reduction allowing more compact and integrated design. Specific molded or extruded thermoplastic articles are selected from the group consisting of truck air brake tubes; automotive and non-automotive fuel lines; automotive coolant lines; oil lines; radiator end tanks; engine mounts; torque rods; pneumatic and hydraulic lines used in industrial machinery; piping, liners and sheaths used in pipes for mining and transportation of oil, gas and water; filaments used for industrial and consumer applications such as brushes and those used for paper machine belts; and sporting goods such as lamination layers for skis and ski boots.

The thermoplastic polymer compositions described herein are illustrated by the following examples. It should be understood that the following examples are for illustration purposes only, and are not used to limit the present invention thereto.

EXAMPLES

Materials

Polyamide i) PA 612/6T, a semi-aromatic, semi-crystalline co-polyamide with 75 mole % repeat units derived from hexamethylene diamine, and dodecanedioic acid and 25 mole % repeat units derived from hexamethylene diamine and terephthalic acid, having a melting point of 210° C. and nominal inherent viscosity of 0.5 percent by weight solution in m-cresol of 1.25 at 25° C., was used, available from DuPont, Wilmington, DE.

ii) PA 612, a homo-polyamide of hexamethylene diamine and dodecanedioic acid commercially available as Zytel® 158 NC010 from DuPont, Wilmington, DE, having a melting point of 218° C. and nominal inherent viscosity of 0.5 percent by weight solution in m-cresol of 1.2 at 25° C. was used.

iii) PA 610/6T, a semi-aromatic, semi-crystalline co-polyamide with 80 mole % repeat units derived from hexamethylene diamine, and decanedioic acid and 20 mole % repeat units derived from hexamethylene diamine and terephthalic acid, having a melting point of 210° C. and nominal inherent viscosity of 0.5 percent by weight solution in m-cresol of 1.25 at 25° C., was used, available from DuPont, Wilmington, DE.

iv) PA 610, a homo-polyamide of hexamethylene diamine and decanedioic acid commercially available as Zytel® RSLC 3090 NC010 from DuPont, Wilmington, DE, having a melting point of 218° C. and nominal inherent viscosity of 0.5 percent by weight solution in m-cresol of 1.4 at 25° C. was used.

v) PA 6, a homo-polyamide of caprolactam commercially available as Ultramid® B40 from BASF Corporation, Wyandotte, MI having a melting point of 220° C. and relative viscosity per ISO test method 307 specification (1 percent by weight solution in 96% sulfuric acid) of 3.89-4.17 at 25° C. was used.

Olefinic Polymeric Toughener i) Engage 8180, an elastomeric polyolefin containing 58 percent by weight ethylene and 42 weight percent 1-octene available from Dow Chemical Company was used.

ii) Innovene H3G-01, a homopolymer of polypropylene available from Ineos Olefins and Polymers.

iii) Yuclair® FT411, Linear Low Density Polyethylene (LLDPE) with 1-butene comonomer from S K Global Chemical Company was used.

iv) Braskem DS6D81, a random copolymer of polypropylene with ethylene comonomer, available from Braskem America Inc.

v) Pro-Fax 7823, impact polypropylene copolymer with ethylene comonomer and available from Lyondell.

Reactive Monomer

Maleic Anhydride was used as reactive monomer and was obtained from UPC Technology Corporation, Taiwan.

Organic Peroxide

Organic peroxide, 2, 5-dimethyl-2, 5-di(tert-butylperoxy)-hexane (DHBP), obtained from United Initiators GmbH & Co. KG, Germany was used.

Additives

Uniplex 214, n-butyl benzene sulfonamide available from Unitex Chemicals, USA was used as plasticizer.

Irganox® 1098 a hindered phenol type antioxidant available from BASF, Germany was used.

Naugard® 445, an aromatic amine type antioxidant available from Chemtura, USA.

Tinuvin® 326 a UV absorber available from BASF, Germany was used. Chimassorb® 944 a hindered amine available from BASF, Germany was used as a light stabilizer.

Aluminum distearate is a lubricant available from Ajay North America was used.

Black masterbatch is a colorant masterbatch containing 35% carbon black in an ethylene-methacrylate carrier.

Methods

Preparation of Co-Grafted Polymeric Toughener

Co-grafted polymeric toughener: A co-grafted polymeric toughener was produced by the free radical melt grafting of maleic anhydride in the presence of the peroxide in a 43 mm size 12 barrel Berstorff intermeshing co-rotating twin screw extruder.

The grafting reaction was performed by feeding the two types of polyolefins in requisite proportions to the feed throat of the compounder, introducing maleic anhydride in liquid form and the organic peroxide via a masterbatch in the ethylene-octene copolymer carrier into the extruder with a barrel temperature setting in the range of 180-320° C., to produce a uniform co-grafted polymeric toughener. Unreacted maleic anhydride was removed whenever required from the melt by vacuum venting. The resulting co-grafted polymeric tougheners were pelletized.

Relative amounts of, polyolefins, maleic anhydride, organic peroxide and conditions of extrusion were set to achieve a grafting percentage in the range of 0.1 to 3.0 percent by weight, and a melt index of 1-20 gm/10 min (as measured per the method described below).

Preparation of Thermoplastic Polymer Composition by Melt Blending

Thermoplastic polymer compositions were prepared in a 25 mm Werner and Pfleiderer twin screw extruder having a nine barrel configuration. Pre-calculated amount of polyamide, co-grafted polymeric toughener and required additives were pre-blended in a dry blender and the dry blended composition was fed in to the extruder through the front feeder. For melting of polyamides and dispersion of co-grafted polymeric tougheners into polyamide matrix, two kneading and mixing screw elements were placed downstream of the feed port of the extruder followed by a vacuum venting port in barrel no 4 for continuous removal of volatiles from the melt during extrusion. Liquid plasticizer was then injected into the polymer melt from a liquid feeder in barrel no 6 and three kneading and mixing screw elements were provided in the screw configuration after addition of the plasticizer to achieve uniform dispersion in the blend. Molten composition was then extruded through a die and pelletized using an underwater pelletizer. The barrel temperature was set at 210° C. at the feed zone which was maintained at 240° C. at the die zone. During extrusion the screw speed was 400 rpm, and throughput of the extruder was controlled at 250 gm/min.

Compounded thermoplastic polymer composition pellets were subsequently dried under a nitrogen atmosphere at 60° C. for about 10 h prior to molding or further extrusion into tubing.

Molding of Melt Blended Thermoplastic Polymer Composition

The dried pellets of melt blended thermoplastic polymer compositions were molded into test pieces per ASTM D638 and ASTM D790 specifications using a 180 ton Nissei Injection molding machine. The barrel temperature profile was 225° C. at the feed port to 235° C. at the nozzle. Mold temperature was maintained at 50° C. The melt blended compositions were pre-dried at 65° C. overnight in a dehumidifying dryer to provide a moisture level of less than 0.05% that is suitable for molding. Molded bars were ejected from the cavity and stored in dry-as-molded condition in vacuum sealed aluminum foiled bags until ready for testing.

Extrusion of Tubes

The thermoplastic polymer compositions as described herein above were further extruded in the form of a tube of uniform dimension in a 50 mm single screw extruder from Davis Standard with L:D ratio of 30:1 and attached with a barrier screw and a Genca spiral die, wherein the screw speed of the extruder was 20 rpm. Setup included a die with 12.5 mm bushing and 8.9 mm tip, and a water cooling tank with 8.6 mm size at its entrance. The resulting tubing was taken off using a belt puller, and was cut to 30 cm pieces for relevant testing.

The barrel temperature of the extruder was maintained at 220° C. at the feed zone of the extruder and 230° C. at the die. Tubes with two dimensions were produced, the first with outside diameter (OD) 6.3 mm and wall thickness 1 mm, extruded at a line speed of about 14 m/min (46 ft/min) and the second with outside diameter (OD) 8 mm and wall thickness 1 mm extruded at a line speed of 10 m/min (35 ft/min).

Test Methods

Measurement of Density

The density of the co-grafted polymeric tougheners was determined per ASTM D792's specification.

Measurement of Softening Point or Temperature

The softening point or temperature of the co-grafted polymeric tougheners was determined with differential scanning calorimetry (DSC, Q2000 from TA Instruments) at a scan rate of 10° C./min in the first heating scan as per ASTM D3418 specification.

Determination of Melt Flow Index (MFI)

Melt flow index (MFI) of the co-grafted polymeric tougheners was determined per ASTM D1238 using Tinius Olsen Melt Indexer, MODEL M 987 at 190° C., with a 0.0825" (0.209 cm.) diameter orifice and 2.16 kg load.

Determination of Grafting Percentage

Nominal maleic anhydride graft level was measured by Fourier transform infrared spectroscopy (Nicolet Avitar 330 FTIR spectrophotometer) using sample films prepared from said maleated polyolefins and calibrated using internally prepared standards.

Determination of Glass Transition Temperature (Tg)

Glass Transition Temperature (Tg) of the co-grafted polymeric tougheners was determined from the corresponding tan delta peak of Dynamic Mechanical Analysis (DMA) test data done using DMA Q800 equipment from TA Instruments, New Castle, DE, USA. Test pieces measuring nominally 18 mm×12.5 mm×3.2 mm cut from injection molded test bars were used. The bars were equilibrated to −140° C. for 3 to 5 minutes, and then DMA was conducted in single cantilever mode with 1 Hz frequency, sinusoidal mechanical vibration at an amplitude of 20 micrometer through a temperature sweep of −140 to +160° C. at a rate of 2° C./min. Tan delta value was computed from the corresponding value of loss modulus (E") and storage modulus (E').

Measurement of Tensile Properties

Tensile properties, such as tensile strength, elongation at break and yield strength of thermoplastic polymer compositions at 23° C. were measured per ASTM D638 specification with Type IV bars using an Instron Universal tester model 4202 at a crosshead speed of 50 mm/min. Averages of five test samples are listed in the Table 3.

Measurement of Flexural Modulus

Flexural modulus of thermoplastic polymer compositions at 23° C. were measured per ASTM D790 specification with Type IV bars using an Instron Universal tester model 4469. Averages of 5 test samples are listed in the Tables 3 and 4.

Testing of Burst Pressure

Measurements of burst pressure of the tubes were performed using an Isco syringe pump of model 500D wherein water was used as the hydraulic medium. A high pressure hose was used to supply the pressurized hydraulic medium, herein water from the pump to the specimen tube sample, and the specimen sample was connected to the hose using a Swagelok quick connect fitting. Specimen tubes were nominally 30 cm (12 inch.) long.

Prior to testing the burst pressure, tube specimens were subjected to several conditioning protocols as called for in the US Department of Transportation (DOT) Standard 571.106, Requirements—Plastic air brake tubing, plastic air brake tubing assemblies or per intended comparisons.

(a)) Burst testing of tube specimens conditioned to controlled level of humidity. Tube specimens were kept in a controlled temperature and humidity chamber at 23° C. and 50% relative humidity for at least 1 week prior to testing for conditioning. For measurement of burst pressure, the hose and the tube specimen were purged with water to remove entrapped air, and then the open end of the tube was plugged with a blunt quick connect Swagelok fitting. The pump was then operated to generate pressure at a controlled rate of 50 psi/s until the burst occurred. The peak pressure at burst was recorded using a digital pressure gauge. According to the US Department of Transportation (DOT) Standard 571.106 requirements, the tube specimen of dimension 30 cm length, 6.3 mm outside diameter (OD) and 1 mm wall thickness must have a minimum burst pressure of 1200 psi. Five tube specimens were tested for measurement of burst pressure at room temperature and corresponding average data was used.

(b) Burst testing of tube specimens subjected to boiling water conditioning and cold impact. The tube specimens were first conditioned in boiling water for 2 hours and allowed to cool to room temperature for about 15 minutes; then positioned in a cold impact test jig as described in the Standard 571.106 mentioned herein above. The jig allows the tube specimen to be impacted by a hemispherical hammer weighing 454 gm dropping vertically onto the span of the tube from a height of 30 cm. The jig with the tube specimens and impacting hammer was positioned inside a freezer set at −40° C. The whole assembly was left at that temperature for 16-20 hours, and the tube specimens were then impacted by the falling hammers while still inside the freezer. Impacted specimens were withdrawn, examined for any failure. When there were no failures, tube specimens were allowed to warm up to room temperature for 20 minutes, and then subjected to burst test as per the above procedure. The US Department of Transportation (DOT) Standard 571.106 requires that the tubes of dimension 30 cm length, 6.3 mm outside diameter (OD) and 1 mm wall thickness retain burst pressure of at least 80% of the original requirement, viz., 960 psi for this dimension.

(c) Burst testing of tube specimens at high temperature. The test specimens were connected to the high pressure pump hose and positioned inside a hot air circulating oven through a side opening and the oven was set to the desired test temperature of 125° C. and 100° C. as required. The air inside the test specimen was not purged to avoid subsequent cooling down of the tubes when contact with the pressurized room temperature water. Tube specimens were heated for about 30 min, and then the pump was operated at the rate of 50 psi/s to effect the burst. The peak pressure was again recorded using the digital gauge.

Three tube specimens were tested for burst test done at high temperature and corresponding average data was used.

The US Department of Transportation (DOT) Standard 571.106 compliant air brake tube needs to meet all of the requirements mentioned herein above in the standard' such as' the burst pressure, boiling water conditioning and low temperature impact resistance. In addition, it is desirable to have a tube specimen to provide improved burst pressure at high temperature, such as, 100° C. or 125° C. while retaining flexibility for ease of installation as indicated by the flexural modulus of the thermoplastic polymer composition.

Truck air brake tubes in European countries must comply with the ISO 7628 standard. This standard specifies a minimum burst pressure values of 31.3 bar at 100° C., and 25 bar at 125° C. for 1250 kPa class thermoplastic tubing for air brake systems. The tube specimen of 30 cm length, 8 mm outside diameter (OD) and wall thickness of 1 mm were tested per these requirements.

Results of the above testing are provided in Table 4 and Table 5.

Results

Olefinic polymeric toughener compositions and their properties are listed in Table 2 and are represented by E01 through E06 and are ethylene/1-octene elastomeric polyolefinic based polymeric tougheners. PE1 is a polyethylene-based polymeric toughener. PP1 through PP4 are polypropylene based polymeric tougheners. CG1 through CG7 are co-grafted polymeric tougheners.

TABLE 2

Polymeric Tougheners: Compositions and Properties

| Polymeric Toughener | Polymeric Toughener: Base Polymer Type | Density (g/cc) | Melting or Softening Temperature (° C.) | Grafting Percentage (%) | Melt Flow Index | Tg (° C.) |
|---|---|---|---|---|---|---|
| Ethylene/1-octene copolymer based polymeric tougheners | | | | | | |
| E01 | Engage 8180 | 0.86 | 49 | 0 | 0.5 | −56.8 |
| E02 | Engage 8180 | 0.87 | 50 | 0.5 | 1.6 | −56.8 |
| E03 | Engage 8180 | 0.87 | 50 | 0.22 | 2 | −56.8 |
| E04 | Engage 8180 | 0.87 | 50 | 0.85 | 1.2 | −56.8 |
| E06 | Engage 8180 | 0.87 | 50 | 1.3 | 1 | −56.8 |

TABLE 2-continued

Polymeric Tougheners: Compositions and Properties

| Polymeric Toughener | Polymeric Toughener: Base Polymer Type | Density (g/cc) | Melting or Softening Temperature (° C.) | Grafting Percentage (%) | Melt Flow Index | Tg (° C.) |
|---|---|---|---|---|---|---|
| Polyethylene based polymeric tougheners | | | | | | |
| PE1 | Bynel 4206 | 0.92 | 102 | | 2.5 | −18.2 |
| Polypropylene based polymeric tougheners | | | | | | |
| PP1 | Profax 7823 | 0.9 | 165 | 0.59 | 37 | 10.5 |
| PP2 | Innovene HO3G-01 | 0.9 | 165 | 0.5 | 120 | 9.9 |
| PP3 | Braskem DS6D81 | 0.9 | 135 | 0.58 | 122 | 3.7 |
| PP4 | Bynel 50E571 | 0.89 | 156 | | 3.5 (@ 230 C.) | 9.6 |
| Co-grafted polymeric tougheners | | | | | | |
| CG1 | 2:1 Profax 7823:Engage co-grafted | 0.89 | 164 | 0.58 | 3.4 | −45.4 & 12.6 |
| CG2 | 1:1 Profax 7823:Engage co-grafted | 0.89 | 164 | 0.53 | 1.7 | −41.5 & 12.4 |
| CG3 | 2:1 Innovene HO3G-01 Homo-PP:Engage 8180 co-grafted | 0.89 | 165 | 0.56 | 7.3 | −44.8 & 11.6 |
| CG4 | 2:1 Braskem DS6D81 random co-PP/Engage co-grafted | 0.89 | 135 | 0.56 | 7.5 | −45.5 & 3.6 |
| CG7 | 2:1 Yuclair FT411 LLDPE:Engage co-grafted | 0.91 | 120 | 0.6 | 1.3 | −37.9 & −18.2 |

The mechanical properties of different molded thermoplastic polymer compositions prepared as described herein are shown in Table 3.

Samples described in Table 3, contain 37.8 percent by weight PA 612/6T (75/25), 31 percent by weight PA612, 9 percent by weight plasticizer, 0.5 percent by weight antioxidant, 0.3 percent by weight UV absorber, 0.3 percent by weight light stabilizer, 0.1 percent by weight lubricant and 21 percent by weight toughener. Compositions of comparative examples CE1 to CE8 have one or two olefinic polymeric tougheners each of which comprises a single type of polyolefin. Inventive examples IE1 to IE5 have co-grafted polymeric tougheners.

TABLE 3

| Sample | Polymeric Modifier 1, Percent by weight | Polymeric Modifier 2, Percent by weight | Yield Strength @ 23° C., MPa | Tensile Strength @ 23° C., MPa | Elongation at Break @ 23° C. % | Flexural Modulus @ 23° C. (MPa) |
|---|---|---|---|---|---|---|
| CE1 | EO1 - 10.5 | EO2 - 10.5 | 22.6 | 38.6 | 240 | 478 |
| CE2 | PE1 - 15 | EO2 - 6 | 25.1 | 37.8 | 199 | 550 |
| CE3 | PE1 - 15 | EO4 - 6 | 25.7 | 39.7 | 213 | 538 |
| CE4 | PE1 - 15 | EO6 - 6 | 24.9 | 40.2 | 216 | 521 |
| CE5 | PP1 - 15 | EO2 - 6 | 30.9 | 41.4 | 226 | 628 |
| CE6 | PP2 - 15 | EO2 - 6 | 32.9 | 40.9 | 225 | 693 |
| CE7 | PP3 - 15 | EO2 - 6 | 30.3 | 40.7 | 230 | 591 |
| CE8 | PP4 - 10.5 | EO2 - 10.5 | 25.8 | 40.1 | 236 | 518 |
| IE1 | CG7 - 21 | X | 25.2 | 41.2 | 228 | 514 |
| IE2 | CG1 - 21 | X | 26.9 | 40.4 | 210 | 581 |
| IE3 | CG3 - 21 | X | 32.3 | 41.9 | 223 | 650 |
| IE4 | CG4 - 21 | X | 29.3 | 41.6 | 245 | 514 |
| IE5 | CG2 - 21 | X | 25.1 | 42.1 | 239 | 514 |

Results of the testing of tubes with an outside diameter of 6.3 mm and a wall thickness of 1 mm, tested according to burst tests of US DOT 571.106 and ISO 7628, are shown in Table 4.

TABLE 4

| Sample | Impact Modifier 1 (Percent by weight) | Impact Modifier 2 (Percent by weight) | 23° C. and 50% RH | Boiling Water, −40° C. Impact Test | 100° C. | 125° C. | Flexural Modulus, Mpa |
|---|---|---|---|---|---|---|---|
| US DOT 571.106 Specification Requirement | | | 1200 | 960 | | | <650 MPa desirable |
| CE1 | EO1 - 10.5 | EO2 - 10.5 | 1069 | 941 | | 450 | 478 |
| CE2 | PE1 - 15 | EO2 - 6 | 1113 | 1010 | | 350 | 550 |
| CE3 | PE1 - 15 | EO4 - 6 | 1150 | 966 | | 415 | 538 |
| CE4 | PE1 - 15 | EO6 - 6 | 1166 | 985 | | 427 | 521 |
| CE5 | PP1 - 15 | EO2 - 6 | 1492 | 1194 | 771 | 588 | 628 |
| CE6 | PP2 - 15 | EO2 - 6 | 1367 | 1145 | 672 | 599 | 693 |
| CE7 | PP3 - 15 | EO2 - 6 | 1324 | 1072 1/5 fail impact | 600 | 438 | 591 |
| CE8 | PP4 - 10.5 | EO2 - 10.5 | 1117 | 954 | | 434 | 518 |
| IE1 | CG7 - 21 | X | 1267 | 1078 | | 498 | 514 |
| IE2 | CG1 - 21 | X | 1307 | 1124 | | 565 | 581 |
| IE3 | CG3 - 21 | X | 1450 | 1193 | 755 | 641 | 650 |
| IE4 | CG4 - 21 | X | 1305 | 1075 | 678 | 473 | 514 |
| IE5 | CG2 - 21 | X | 1247 | 1065 | | 525 | 514 |

The results show that the samples, CE1 to CE8 either failed to meet the DOT 571.106 boiling water/cold impact burst test requirement or exhibited high stiffness or showed inferior burst values at 100° C. and 125° C. In contrast, inventive examples IE1 to IE5, met the DOT 571.106 requirements for selected tests, and showed improved high temperature burst pressure without compromising flexibility.

The results of testing tubes having outside diameters of 8 mm and 1 mm wall thicknesses and tested according to ISO 7628 specification requirement for 1250 KPa class air brake tubes, are reported in Table 5.

TABLE 5

| Sample | Impact Modifier 1, Percent by weight | Impact Modifier 2, Percent by weight | 23° C. and 50% RH | 100° C. | 125° C. | Flexural Modulus, MPa |
|---|---|---|---|---|---|---|
| ISO 7628 specification requirement For 1250 KPa class air brake tube | | | 50 | 31.3 | 25 | <650 MPa desirable |
| CE1 | EO1 - 10.5 | EO2 - 10.5 | 50.5 | 25.5 | 20.1 | 478 |
| CE2 | PE1 - 15 | EO3 - 6 | 58.6 | 31.5 | 24.2 | 516 |
| CE8 | PP4 - 10.5 | EO2 - 10.5 | 58.5 | 34 | 24.3 | 518 |
| IE1 | CG7 - 21 | X | 63 | 34.2 | 26 | 514 |
| IE2 | CG1 - 21 | X | 70.3 | 38.8 | 30.4 | 581 |
| IE5 | CG2 - 21 | X | 64 | 34.5 | 27.7 | 514 |

These results show that samples IE1, IE2 and IE5 made in accordance with this invention met both the 100° C. and 125° C. burst pressure requirements of ISO 7628 without compromising flexibility while the comparative examples CE1, CE2 and CE8 fell short of meeting these requirements.

Example IE6 was prepared using PA 610/6T semi-aromatic copolyamide and PA 610 aliphatic homopolyamide and comprises 45.6 percent by weight PA 610/6T (80/20), 22 percent by weight PA610, 5.9 percent by weight plasticizer, 0.5 percent by weight antioxidant Irganox 1098, 0.5% by weight of antioxidant Naugard 445, 2% by weight of black masterbatch, 0.1 percent by weight lubricant and 23 percent by weight co-grafted polymeric toughener.

Comparative example CE9 is identical to IE6 except CE9 substitutes an ethylene/1-octene copolymer (EO3) as polymeric toughener in place of the co-grafted polymeric toughener (CG1) used in IE6. The mechanical properties are shown in Table 6.

TABLE 6

| Sample | Polymeric Modifier 1, Percent by weight | Yield Strength @ 23° C., MPa | Tensile Strength @ 23° C., MPa | Elongation at Break @ 23° C., % | Flexural Modulus @ 23° C. (MPa) |
|---|---|---|---|---|---|
| CE9 | EO3-23 | 26.7 | 36.6 | 202 | 505 |
| IE6 | CG1-23 | 33.7 | 47.7 | 215 | 770 |

Burst pressure results of tubes prepared from IE6 and CE9 are shown in Table 7. The burst test procedure is different than the burst test used to obtain the results in Tables 4 and 5. The tubes undergoing testing have dimensions of 6.3 mm OD×1 mm wall or 8 mm OD×1 mm wall. Burst testing at 100° C. and 125° C. was conducted using a specially designed apparatus. A 30 cm long tube was connected to a syringe pump set up to deliver hydraulic oil at a constant preset rate of pressurization of 50 psi/s. The tubes were immersed in a hot oil bath and preheated to the test temperature of 100° C. or 125° C. by immersing the tube in a hot oil bath comprising oil which was identical to the oil pumped through the tube. The pressurized oil pumped through the tubes was heated to the same temperature as the oil bath. The burst test was performed while the tubes were immersed in the hot oil bath.

The results in Table 7 clearly show that tubes prepared using the thermoplastic polymer compositions described herein comprising co-grafted polymeric tougheners B exhibit superior burst pressure compared to the same composition comprising an ethylene/1-olefin copolymer polymeric toughener. At a test temperature of 125° C. IE6 had a burst pressure which was 78% greater than CE9.

TABLE 7

| | Burst Pressure, psi 6.3 mm OD X 1 mm wall tube | | | Burst Pressure, psi 8 mm OD X 1 mm wall | | |
|---|---|---|---|---|---|---|
| Sample | 23° C. and 50% RH | 100° C. | 125° C. | 23° C. and 50% RH | 100° C. | 125° C. |
| CE9 | 1487 | 332 | 269 | Not tested | Not tested | Not tested |
| IE6 | 1615 | 592 | 481 | 1113 | 458 | 371 |

Example IE7 was prepared using PA 610/6T semi-aromatic copolyamide and PA 6 aliphatic homopolyamide and comprises 41 percent by weight PA 610/6T (80/20), 28.9 percent by weight PA6, 5.9 percent by weight plasticizer, 0.5 percent by weight antioxidant Irganox 1098, 0.3 percent by weight UV absorber, 0.3 percent by weight light stabilizer, 0.1 percent by weight lubricant and 23 percent by weight polymeric toughener CG1.

Comparative example CE10 is identical to IE7 except CE10 substitutes an ethylene/1-octene copolymer (EO3) as polymeric modifier in place of the co-grafted polymeric toughener (CG1) used in IE7. The mechanical properties are shown in Table 8.

TABLE 8

| Sample | Polymeric Modifier 1, Percent by weight | Yield Strength @ 23° C., MPa | Tensile Strength @ 23° C., MPa | Elongation at Break @ 23° C., % | Flexural Modulus @ 23° C. (MPa) |
|---|---|---|---|---|---|
| CE10 | EO3-23 | 30.7 | 55.4 | 248 | 544 |
| IE7 | CG1-23 | 37.4 | 56.4 | 200 | 712 |

Tubes prepared from IE7 and CE10 were tested using the same procedure as used to test tubes prepared from IE6 and CE9. The results are shown in Table 9.

TABLE 9

| | Burst Pressure, psi 6.3 mm OD X 1 mm wall tube | | | Burst Pressure, psi 8 mm OD X 1 mm wall | | |
|---|---|---|---|---|---|---|
| Sample | 23° C. and 50% RH | 100° C. | 125° C. | 23° C. and 50% RH | 100° C. | 125° C. |
| CE10 | 897 | 366 | 282 | 692 | 270 | 215 |
| IE7 | 1116 | 447 | 352 | 874 | 357 | 271 |

The results in Table 9 show that tubes prepared using the thermoplastic polymer compositions described herein comprising co-grafted polymeric tougheners B exhibit superior burst pressure compared to the same composition comprising an ethylene/1-olefin copolymer polymeric toughener. At a test temperature of 125° C. IE7 had a burst pressure which was 25% greater than CE10.

We claim:
1. A process of making a thermoplastic polymer composition comprising:
  A) forming a co-grafted polymeric toughening agent by preparing a mixture, b3), comprising a blend of two or more polyolefins exhibiting at least two glass transition temperatures obtained by feeding in an extruder:
    i) 55-90 weight percent of a first polyolefin, b1), with at least one glass transition temperature >−20° C. and a softening temperature >75° C., and is selected from ethylene homo-polymers, propylene homo-polymers and copolymers of ethylene and propylene; and
    ii) 10-45 weight percent of a second polyolefin, b2), having highest glass transition temperature <−20° C. and a softening temperature <75° C. and is selected from copolymers of ethylene and alpha olefins and/or dienes, said alpha olefins and/or dienes selected from the group consisting of propylene, 1-butene, 1-hexene; 1-octene, butadiene and norbornene; wherein the weight percents of b1) and b2) are based on 100% of the total weight of i) and ii), and
    iii) at least one reactive monomer; and
    iv) optionally one peroxide; and
  B) melt blending 5 to 40 weight percent of said mixture obtained in step (A) with a polyamide composition comprising:

v) 55 to 90 weight percent semi-crystalline semi-aromatic co-polyamide; wherein said semi-aromatic co-polyamide comprises
  a) about 10 to 40 mole percent aromatic repeat units derived from one or more aromatic dicarboxylic acid with 8 to 16 carbon atoms and an aliphatic diamine with 4 to 20 carbon atoms; and
  b) about 60 to 90 mole percent aliphatic repeat units derived from one or more aliphatic dicarboxylic acid with 6 to 20 carbon atoms and said aliphatic diamine with 4 to 20 carbon atoms;
vi) 10 to 45 weight percent aliphatic homo-polyamide; wherein said aliphatic homo-polyamide comprises repeat units derived from;
  a) an aliphatic dicarboxylic acid with 6 to 20 carbon atoms and an aliphatic diamine with 4 to 20 carbon atoms; or
  b) an aliphatic lactam or an aliphatic aminocarboxylic acid with 6 to 20 carbon atoms;
wherein the weight percent of v) and vi) are based on the total weight of v) and vi);
vii) 0 to 15 weight percent of one or more plasticizers;
viii) 0 to 5 weight percent of additives selected from the group consisting of antioxidants, flame retardants, UV stabilizers, light stabilizers, thermal stabilizers, lubricants, and colorants; wherein the weight percent of the mixture b3, components vii), and viii), are based on the total weight of the thermoplastic composition; wherein components v), vi), vii), and viii), are melt blended in step (B) downstream of the first extruder where said mixture, b3) is obtained.

2. The process of claim 1, wherein the components in step (A) are melt-blended in step (B) in a second extruder.

3. The process of claim 1, wherein the thermoplastic polymer composition is extruded and pelletized.

4. The process of claim 1, wherein the mixture of step (A) is extruded and pelletized.

5. The process of claim 1, further comprising removing unreacted reactive monomer.

6. The process of claim 1, further comprising extruding and pelletizing the co-grafted polymeric toughening agent.

7. The process of claim 1 wherein said semi-aromatic co-polyamide comprises:
  a) about 10 to 40 mole percent aromatic repeat units derived from:
    i) one or more aromatic dicarboxylic acids with 8 to 16 carbon atoms and an aliphatic diamine with 4 to 20 carbon atoms; and
  b) about 60 to 90 mole percent aliphatic repeat unit derived from:
    ii) one or more aliphatic dicarboxylic acids with 6 to 20 carbon atoms and one aliphatic diamine with 4 to 20 carbon atoms; and
  wherein said aliphatic homo-polyamide comprises repeat units derived from:
    iii) said aliphatic dicarboxylic acid with 6 to 20 carbon atoms and said aliphatic diamine with 4 to 20 carbon atoms.

8. The process of claim 1 wherein the reactive monomer is selected from the group consist of acrylic acid; methacrylic acid; maleic acid; fumaric acid; nadic acid; citaconic acid; itaconic acid; metal salts of the acid, esters, amides or imides of the metal salts or a combinations thereof.

9. The process of claim 1 wherein the co-grafted polymeric toughening agent has a grafting percentage in the range about 0.1 to about 5 weight percent.

* * * * *